United States Patent
Lai

(10) Patent No.: US 12,015,438 B2
(45) Date of Patent: Jun. 18, 2024

(54) SMART ANTENNA SWITCHING METHOD, ELECTRONIC DEVICE AND COMPUTER READABLE STORAGE MEDIUM

(71) Applicant: Nanning FuLian FuGui Precision Industrial Co., Ltd., Nanning (CN)

(72) Inventor: Wei-Fan Lai, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

(21) Appl. No.: 18/210,761

(22) Filed: Jun. 16, 2023

(65) Prior Publication Data
US 2023/0327699 A1 Oct. 12, 2023

Related U.S. Application Data

(63) Continuation of application No. 17/565,403, filed on Dec. 29, 2021, now Pat. No. 11,870,483.

(51) Int. Cl.
H04B 1/44 (2006.01)
(52) U.S. Cl.
CPC ...................... H04B 1/44 (2013.01)
(58) Field of Classification Search
CPC ............ H04B 1/44; H04B 7/08; H04B 1/401; H04W 72/51; H04W 84/12
See application file for complete search history.

(56) References Cited

U.S. PATENT DOCUMENTS

| | | | | |
|---|---|---|---|---|
| 2014/0226539 A1* | 8/2014 | McCoy | .................. | H04B 1/401 370/328 |
| 2014/0329470 A1* | 11/2014 | Chen | .................. | H04B 17/0085 455/67.7 |
| 2015/0188599 A1* | 7/2015 | Shi | ........................... | H04L 1/18 455/78 |
| 2022/0225317 A1* | 7/2022 | Silverman | ............ | H04B 7/0822 |

FOREIGN PATENT DOCUMENTS

| | | |
|---|---|---|
| CN | 110034776 A | 7/2019 |
| TW | 201014238 A | 4/2010 |
| TW | M388175 U | 9/2010 |

* cited by examiner

*Primary Examiner* — Patrick C Chen
(74) *Attorney, Agent, or Firm* — ScienBiziP, P.C.

(57) ABSTRACT

A smart antenna switching method is disclosed. Multiple wireless signal parameters of a wireless network environment are collected. Under a current operating phase, when a holding period of a to-be-switched antenna is 0, the qualities of wireless signals between an initial antenna and the to-be-switched antenna are compared according to the wireless signal parameters. When a comparing period of the to-be-switched antenna is 0, it is determined whether an antenna switching operation is performed. If the antenna switching operation is not performed, the next operating phase is served as the current operating phase. If the antenna switching operation is performed, a signal receiving-and-sending operating is switched from the to-be-switched antenna to the outdoor antenna or from the outdoor antenna to the to-be-switched antenna, and the previous operating phase is served as the current operating phase.

12 Claims, 4 Drawing Sheets

SMART ANTENNA SWITCHING METHOD, ELECTRONIC DEVICE AND COMPUTER READABLE STORAGE MEDIUM

BACKGROUND

Technical Field

The disclosure relates to smart antennas, and more particularly to a smart antenna switching method, electronic device, and computer readable storage medium.

Description of Related Art

Since 5G communications mostly operate at high frequencies, electromagnetic penetration thereof is poor that results in significantly poorer transmission and reception quality when an antenna device is indoors or even in the basement. Known smart antenna switching operations are based on only the difference of received signal strength indicator (RSSI) values between the antennas to determine whether the signal transmission quality of the antennas is good or not. When the signal transmission quality of an antenna is poor, the transmitted signal strength of the antenna is increased which results in higher power loss.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
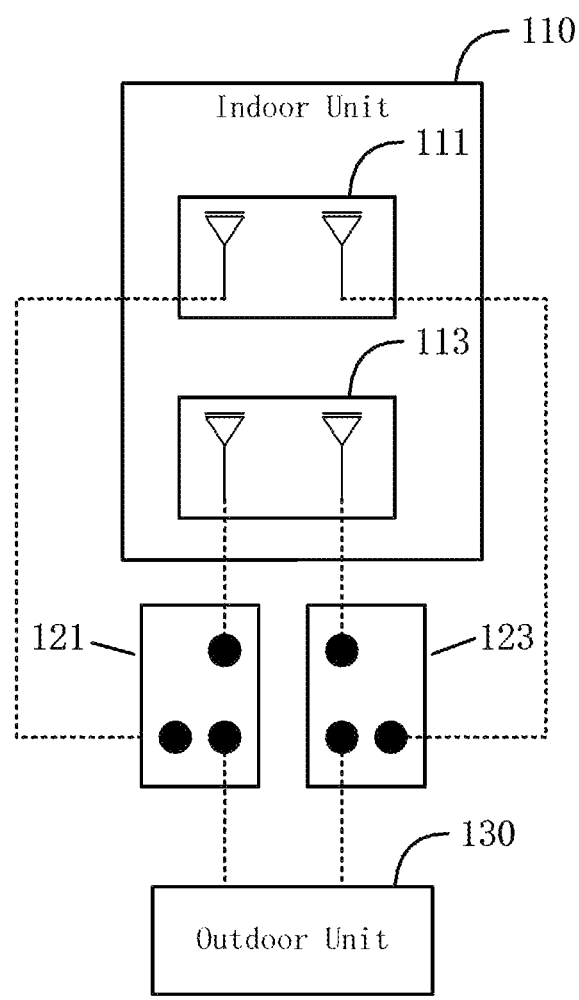
FIG. 1 is a block diagram of an embodiment of a smart antenna switching system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

An embodiment of a smart antenna switching method of the present disclosure adds an extensible outdoor antenna device, so that part of an indoor antenna device can be intelligently switched to an outdoor antenna device for wireless signal receiving-and-sending. As there is any variation of the indoor antenna occurs, for example, the indoor antenna is damaged or interfered by mobile obstacles, available antennas can be quickly awakened to be switched for the wireless signal receiving-and-sending to provide good wireless signals and effectively solve the power consumption.

FIG. 1 is a block diagram of an embodiment of a smart antenna switching system of the present disclosure. The embodiment of the smart antenna switching system 100 including an indoor unit (IDU) 110, switching devices 121 and 123 and an outdoor unit (ODU) 130. The IDU 110 includes at least two sets of antennas, of which one set is an initial antenna 111 and the other is to-be-switched antenna 113. Signal receiving-and-sending of the to-be-switched antenna 113 switched to the ODU 130 via the switching devices 121 and 123, when the wireless signal quality of the IDU 100 is not good, to improve the wireless signal quality. The IDU 100 determines whether to switch the signal receiving-and-sending operation from the to-be-switched antenna 113 to the ODU 130, or from the ODU 130 to the to-be-switched antenna 113, for execution according to the wireless signal quality between the initial antenna 111 and the to-be-switched antenna 113. At the same time, a holding period (HP) and a comparing period (CP) of the to-be-switched antenna 113 is adjusted according to whether to switch the to-be-switched antenna 113.

Figure 2:
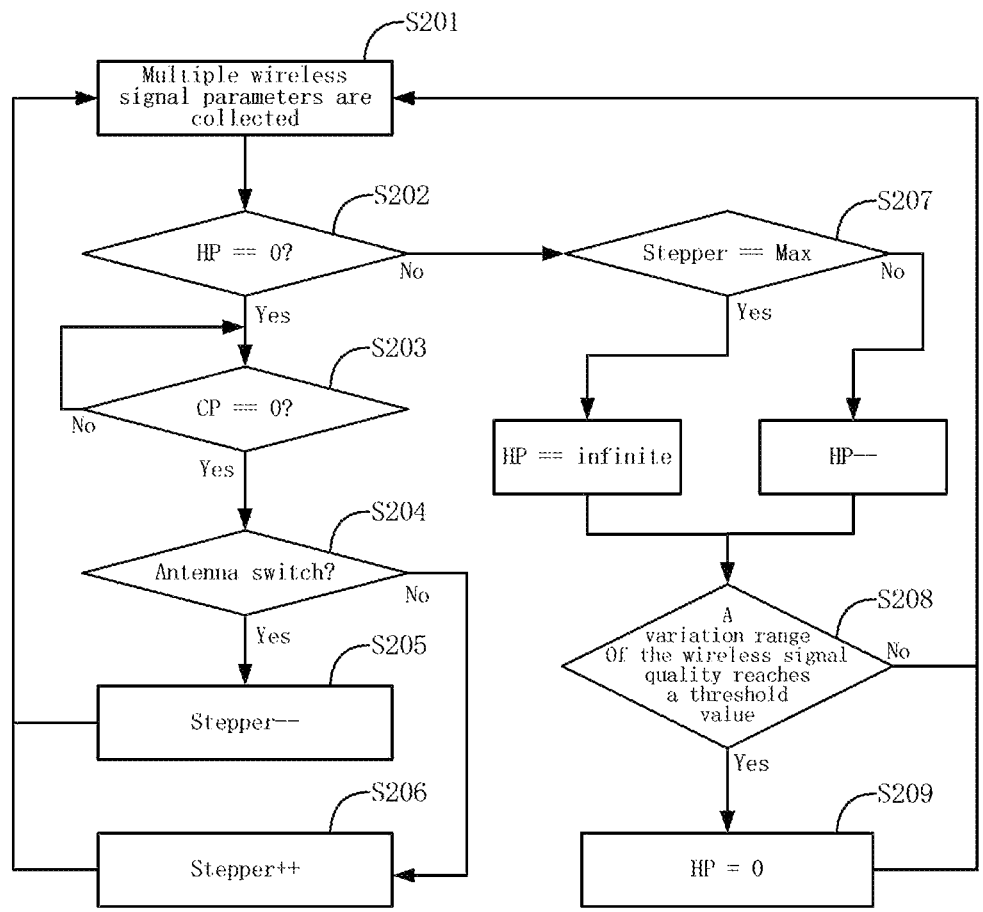
FIG. 2 is a flowchart of an embodiment of a smart antenna switching method of the present disclosure.

FIG. 2 is a flowchart of an embodiment of a smart antenna switching method executable by a microcontroller of an electronic device of the present disclosure. The electronic device may be the IDU 110 shown in FIG. 1. According to different needs, the order of the steps in the flowchart can be changed, and some steps can be omitted.

In step S201, multiple wireless signal parameters of a wireless network environment are collected. The wireless signal parameters include a received signal strength indicator (RSSI), a reference signal receiving quality (RSRQ), a reference signal receiving powers (RSRP) and the like.

In step S202, under a current operating phase, it is determined whether a holding period (HP) of the to-be-switched antenna 113 is 0, indicating that whether the to-be-switched antenna 113 is working. It is noted that, in this embodiment, the term "phase" is defined as "stepper". The HP refers to a time period during which the to-be-switched antenna 113 maintains operation in a certain operating phase, while the CP refers to a time period for comparing the wireless signal qualities between the initial antenna 111 and the to-be-switched antenna 113 in the same operating phase.

In an embodiment of the present disclosure, for example, 5 operating phases, phase=1 to 5, are defined, which are presented as follows.

The first phase, phase=1, the HP value is 30 seconds, and the CP value is 1 minute.

The second phase, phase=2, the HP value is 1 minute, and the CP value is 40 seconds;

The third phase, phase=3, the HP value is 10 minutes, and the CP value is 30 seconds;

The fourth phase, phase=4, the HP value is 30 minutes, and the CP value is 10 seconds; and The fifth phase, phase=5, the HP value remains unchanged that is considered as infinite, and the CP value is second or any value.

In step S203, if the HP value is 0, indicating that the time period for the to-be-switched antenna 113 to maintain operation in the current operating phase has ended, the wireless signal quality of the initial antenna 111 is compared with that of the to-be-switched antenna 113 according to the wireless signal parameters in the current operating phase, and it is determined whether the CP value in the current operating phase is 0 (CP==0). If the CP value is not 0, the comparing operation keeps working.

In the current operating phase, the step of comparing the wireless signal quality of the initial antenna 111 with that of the to-be-switched antenna 113 according to the wireless signal parameters in the current operating phase comprises the followings:

Cell loading values of the initial antenna 111 and the to-be-switched antenna 113, $Cell\_Loading_{111}$ and $Cell\_Loading_{113}$, are calculated using a formula (1), the formula (1) is represented as:

$$Cell\_Loading = \frac{5}{7N} \times 10^{\frac{(RSSI-RSRP)}{10}}; \quad (1)$$

wherein N=12×channel_bandwidth×5, N represents the total amount of subcarriers and channel_bandwidth represents bandwidth.

Further, signal scores of the initial antenna 111 and the to-be-switched antenna 113, $Score_{111}$ and $Score_{113}$, are calculated using a formula (2), the formula (2) is represented as:

$$Score = RSRP + (0.73 - Cell\_Loading \times 1.67) \times RSRQ \quad (2)$$

If $Score_{111} > Score_{113}$, the wireless signal quality of the initial antenna 111 is better than that of the to-be-switched antenna 113, and, on the contrary, the wireless signal quality of the initial antenna 111 is less than that of the to-be-switched antenna 113.

In step S204, if the CP value is 0, it is determined whether an antenna switching operation is performed according to the determining result of the wireless signal quality. In other words, the signal receiving-and-sending operation is switched from the to-be-switched antenna 113 to the ODU 130 or from the ODU 130 to the to-be-switched antenna 113 for execution.

In step S205, if the antenna switching operation is not performed, the phase is increased by 1 (stepper++), which takes the next operating phase as the current operating phase that the HP value is increased, and the CP value is decreased. The process then proceeds to step S201 to keep collecting the wireless signal parameters of the wireless network environment and the aforementioned steps are repeatedly performed.

In step S206, if the antenna switching operation is performed, the signal receiving-and-sending operation is switched from the to-be-switched antenna 113 to the ODU 130 or from the ODU 130 to the to-be-switched antenna 113 for execution and the phase is increased by 1 (stepper—) that the HP value is decreased and the CP value is increased. The process then proceeds to step S201 to keep collecting the wireless signal parameters of the wireless network environment and the aforementioned steps are repeatedly performed.

In step S207, referring to step S202, if the HP value is not 0, it is determined whether the current operating phase is the last operating phase (Phase==Max).

If the current operating phase is the last operating phase, indicating that the HP value is infinite (HP==infinite). At present, the signal receiving-and-sending operation is always performed by the currently operating antenna, the to-be-switched antenna 113 to the ODU 130. Otherwise, if the current operating phase is not the last operating phase, the HP is decreased by 1.

In step S208, it is determined whether a variation range of the wireless signal quality in the wireless network environment reaches a threshold value, for example, the variation range of the RSRP value reaches the threshold value. If the variation range of the wireless signal quality in the wireless network environment does not reach the threshold value, the process then proceeds to step S201 to keep collecting the wireless signal parameters of the wireless network environment and the aforementioned steps are repeatedly performed.

In step S209, if the variation range of the wireless signal quality in the wireless network environment reaches the threshold value, the HP value of the currently operating antenna as is set as 0, the process then proceeds to step S201 to keep collecting the wireless signal parameters of the wireless network environment and the aforementioned steps are repeatedly performed.

Figure 3:
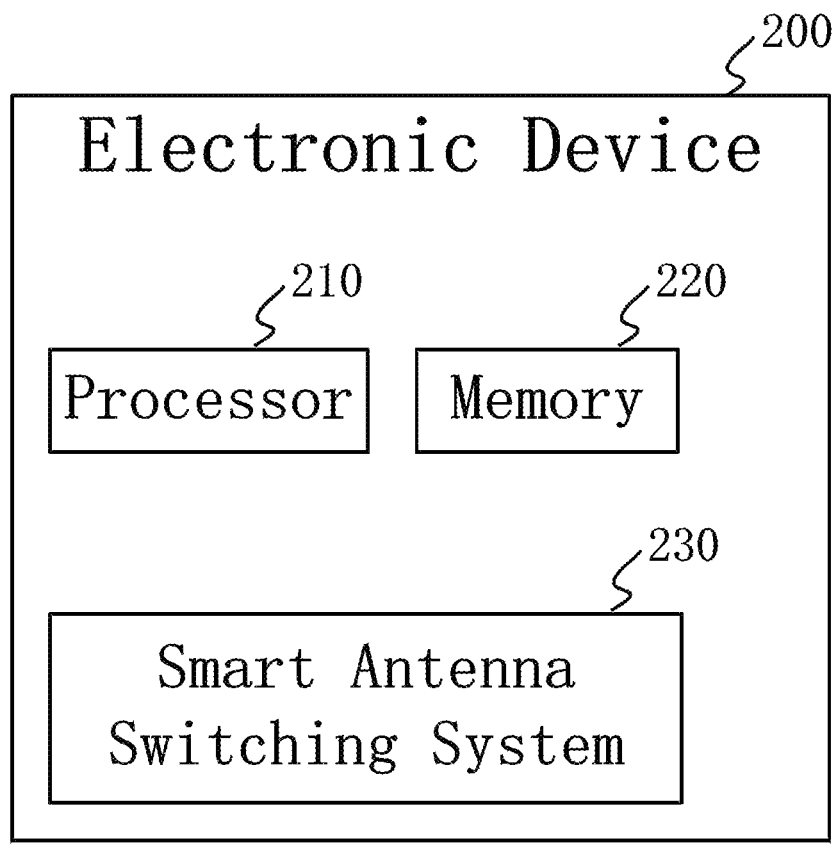
FIG. 3 is a block diagram of an embodiment of the hardware architecture of an electronic device using the method of the present disclosure.

FIG. 3 is a block diagram of an embodiment of the hardware architecture of an electronic device using the smart antenna switching method of the present disclosure. The electronic device 200 may be, but is not limited to, connected to a processor 210, a memory 220, and a smart antenna switching system 230 via system buses. The electronic device 200 shown in FIG. 3 may include more or fewer components than those illustrated, or may combine certain components.

The memory 220 stores a computer program, such as the smart antenna switching system 230, which is executable by the processor 210. When the processor 210 executes the smart antenna switching system 230, the blocks in one embodiment of the booting mode configuration method applied in the electronic device 200 are implemented, such as blocks S201 to S209 shown in FIG. 2.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the smart antenna switching system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The smart antenna switching system 230 can be partitioned into one or more modules/units that are stored in the memory 220 and executed by the processor 210. The one or more modules/units may be a series of computer program instructions capable of performing particular functions of the smart antenna switching system 230.

Figure 4:
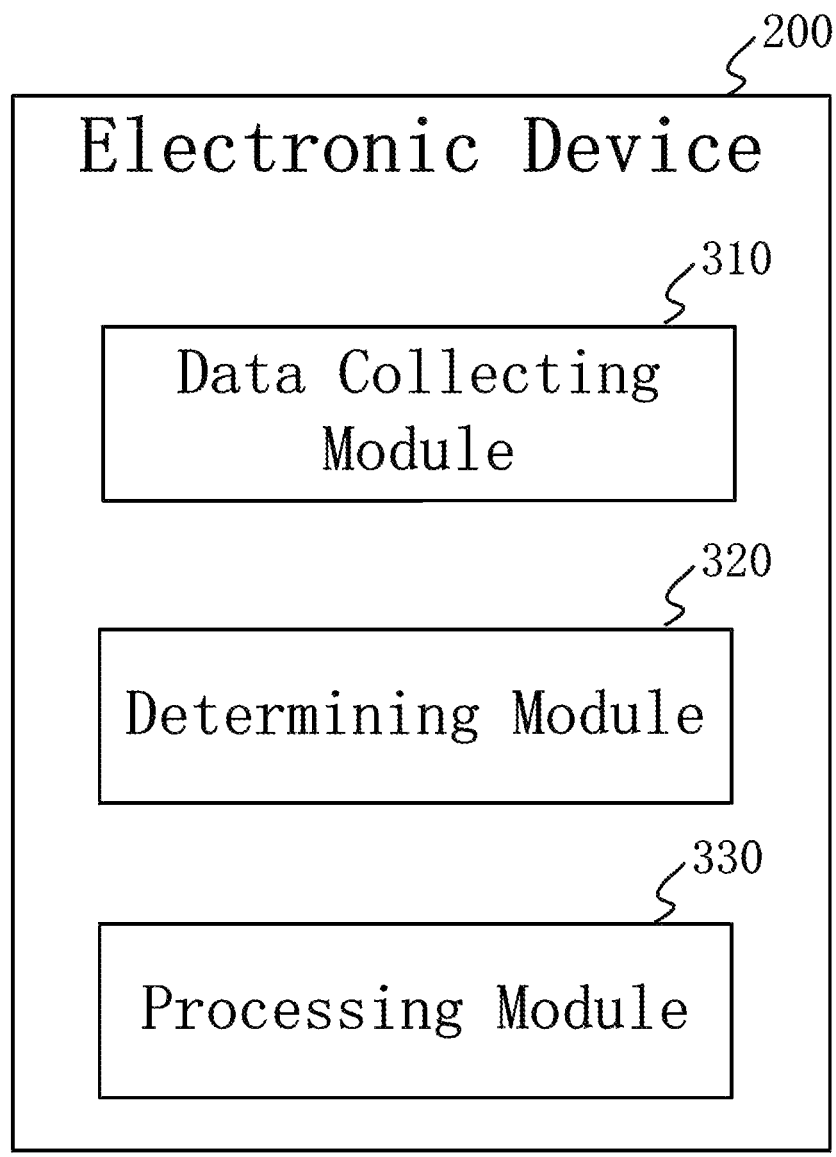
FIG. 4 is a block diagram of an embodiment of functional blocks of the electronic device of the present disclosure.

FIG. 4 is a schematic diagram of an embodiment of functional blocks of the electronic device using the method of the present disclosure.

The electronic device 200, for example, a smart antenna device, comprises a data collecting module 310, a determining module 320 and a processing module 330.

The data collecting module 310 collects multiple wireless signal parameters of a wireless network environment. The wireless signal parameters include an RSSI, an RSRQ, an RSRP and the like.

The determining module 320 determines, under a current operating phase, whether a holding period (HP) of the to-be-switched antenna 113 is 0, indicating that whether the to-be-switched antenna 113 is working. The HP refers to a time period during which the to-be-switched antenna 113 maintains operation in a certain operating phase, while the CP refers to a time period for comparing the wireless signal qualities between the initial antenna 111 and the to-be-switched antenna 113 in the same operating phase.

In an embodiment of the present disclosure, for example, 5 operating phases, phase=1 to 5, are defined, which are presented as follows.

The first phase, phase=1, the HP value is 30 seconds, and the CP value is 1 minute.

The second phase, phase=2, the HP value is 1 minute, and the CP value is 40 seconds;

The third phase, phase=3, the HP value is 10 minutes, and the CP value is 30 seconds;

The fourth phase, phase=4, the HP value is 30 minutes, and the CP value is 10 seconds; and The fifth phase, phase=5, the HP value remains unchanged that is considered as infinite, and the CP value is second or any value.

If the HP value is 0, indicating that the time period for the to-be-switched antenna 113 to maintain operation in the current operating phase has ended, the determining module 320 compares the wireless signal quality of the initial antenna 111 with that of the to-be-switched antenna 113 according to the wireless signal parameters in the current operating phase, and determines whether the CP value in the current operating phase is 0 (CP==0). If the CP value is not 0, the comparing operation keeps working.

Cell loading values of the initial antenna 111 and the to-be-switched antenna 113, Cell_Loading$_{111}$ and Cell_Loading$_{113}$, are calculated using a formula (1), the formula (1) is represented as:

$$\text{Cell\_Loading} = \frac{5}{7N} \times 10^{\frac{(RSSI-RSRP)}{10}};\qquad(1)$$

wherein N=12×channel_bandwidth×5, N represents the total amount of subcarriers and channel_bandwidth represents bandwidth.

Further, signal scores of the initial antenna 111 and the to-be-switched antenna 113, Score$_{111}$ and Score$_{113}$, are calculated using a formula (2), the formula (2) is represented as:

$$\text{Score}=\text{RSRP}+(0.73-\text{Cell\_Loading}\times 1.67)\times\text{RSRQ} \qquad(2).$$

If Score$_{111}$>Score$_{113}$, the wireless signal quality of the initial antenna 111 is better than that of the to-be-switched antenna 113, and, on the contrary, the wireless signal quality of the initial antenna 111 is less than that of the to-be-switched antenna 113.

If the CP value is 0, the determining module 320 determines whether an antenna switching operation is performed according to the determining result of the wireless signal quality. In other words, the signal receiving-and-sending operation is switched from the to-be-switched antenna 113 to the ODU 130 or from the ODU 130 to the to-be-switched antenna 113 for execution.

If the antenna switching operation is not performed, the processing module 330 increases the phase by 1 (stepper++), which takes the next operating phase as the current operating phase that the HP value is increased, and the CP value is decreased. The data collecting module 310 then keeps collecting the wireless signal parameters of the wireless network environment and the aforementioned steps are repeatedly performed.

If the antenna switching operation is performed, the processing module 330 switches the signal receiving-and-sending operation from the to-be-switched antenna 113 to the ODU 130 or from the ODU 130 to the to-be-switched antenna 113 for execution and increases the phase by 1 (stepper—) that the HP value is decreased and the CP value is increased. The data collecting module 310 keeps collecting the wireless signal parameters of the wireless network environment and the aforementioned steps are repeatedly performed.

If the HP value is not 0, the determining module 320 determines whether the current operating phase is the last operating phase (Phase==Max).

If the current operating phase is the last operating phase, the HP value is assigned as infinite (HP==infinite) while the CP value may be assigned as 0 or any value. At present, the signal receiving-and-sending operation is always performed by the currently operating antenna, the to-be-switched antenna 113 to the ODU 130. Otherwise, if the current operating phase is not the last operating phase, the processing module 330 decreases the HP by 1 (HP—).

The determining module 320 determines whether a variation range of the wireless signal quality in the wireless network environment reaches a threshold value, for example, the variation range of the RSRP value reaches the threshold value. If the variation range of the wireless signal quality in the wireless network environment does not reach the threshold value, the data collecting module 310 keeps collecting the wireless signal parameters of the wireless network environment and the aforementioned steps are repeatedly performed.

If the variation range of the wireless signal quality in the wireless network environment reaches the threshold value, processing module 330 sets the HP value of the currently operating antenna as 0. The data collecting module 310 keeps collecting the wireless signal parameters of the wireless network environment and the aforementioned steps are repeatedly performed.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A smart antenna switching method executable by an electronic device comprising an initial antenna and a to-be-switched antenna connecting to an outdoor antenna, the method comprising:
   collecting multiple wireless signal parameters of a wireless network environment;
   determining, under a current operating phase, whether a holding period of the to-be-switched antenna is 0;
   comparing, if the holding period of the to-be-switched antenna is 0, qualities of wireless signals between the initial antenna and the to-be-switched antenna according to the wireless signal parameters and determining whether a comparing period is 0;
   calculating cell loading values of the initial antenna and the to-be-switched antenna using a formula (1), wherein the formula (1) is represented as:

$$\text{Cell\_Loading} = \frac{5}{7N} \times 10^{\frac{(RSSI-RSRP)}{10}}; \quad (1)$$

where N=12×channel_bandwidth×5, N represents a total amount of subcarriers and channel_bandwidth represents bandwidth;
   calculating signal scores of the initial antenna and the to-be-switched antenna using a formula (2), wherein the formula (2) is represented as:

Score=RSRP+(0.73−Cell_Loading×1.67)×RSRQ    (2);

determining a wireless signal quality of the initial antenna and the to-be-switched antenna according to the signal scores of the initial antenna and the to-be-switched antenna;
   determining, if the comparing period is 0, whether an antenna switching operation is performed;
   adjusting, if the antenna switching operation is not performed, the current operating phase and setting the holding period and the comparing period according to the adjusted operating phase; and
   switching, if the antenna switching operation is performed, a signal receiving-and-sending operation from the to-be-switched antenna to the outdoor antenna or from the outdoor antenna to the to-be-switched antenna, and adjusting the current operating phase to a previous operating phase and setting the holding period and the comparing period according to the adjusted operating phase.

2. The method of claim 1, further comprising:
   determining, if the holding period of the to-be-switched antenna is not 0, whether the current operating phase is a last operating phase;
   indicating, if the current operating phase is the last operating phase, that the holding period is infinite and the signal receiving-and-sending operation is performed by a currently operating antenna; and
   decreasing, if the current operating phase is not the last operating phase, the holding period by 1.

3. The method of claim 2, further comprising:
   determining whether a variation range of the wireless signal quality in the wireless network environment reaches a threshold value; and
   continuously collecting, if the variation range of the wireless signal quality in the wireless network environment does not reach the threshold value, the multiple wireless signal parameters of the wireless network environment.

4. The method of claim 3, further comprising:
   setting, if the variation range of the wireless signal quality in the wireless network environment reaches the threshold value, the holding period of the currently operating antenna as 0, and continuously collecting the multiple wireless signal parameters of the wireless network environment.

5. An electronic device, comprising:
   an initial antenna;
   a to-be-switched antenna connecting to an outdoor antenna;
   a data collecting module, configured to collect multiple wireless signal parameters of a wireless network environment;
   a determining module, configured to, under a current operating phase, determine whether a holding period of the to-be-switched antenna is 0, if the holding period of the to-be-switched antenna is 0, compare qualities of wireless signals between the initial antenna and the to-be-switched antenna according to the wireless signal parameters and determine whether a comparing period is 0, and, if the comparing period is 0, determine whether an antenna switching operation is performed;
   wherein the determining module is configured to:
   calculate cell loading values of the initial antenna and the to-be-switched antenna using a formula (1), wherein the formula (1) is represented as:

$$\text{Cell\_Loading} = \frac{5}{7N} \times 10^{\frac{(RSSI-RSRP)}{10}}; \quad (1)$$

wherein N=12×channel_bandwidth×5, N represents the total amount of subcarriers and channel_bandwidth represents bandwidth;
   calculate signal scores of the initial antenna and the to-be-switched antenna using a formula (2), wherein the formula (2) is represented as:

Score=RSRP+(0.73−Cell_Loading×1.67)×RSRQ    (2); and determine a wireless signal quality of the initial antenna and the to-be-switched antenna according to the signal scores of the initial antenna and the to-be-switched antenna; and
   a processing module, configured to, if the antenna switching operation is not performed, take a next operating phase as the current operating phase and set the holding period and the comparing period according to the adjusted current operating phase, and, if the antenna switching operation is performed, switch a signal receiving-and-sending operation from the to-be-switched antenna to the outdoor antenna or from the outdoor antenna to the to-be-switched antenna, take a previous operating phase as the current operating phase and set the holding period and the comparing period according to the adjusted current operating phase.

6. The device of claim 5, wherein:
if the holding period of the to-be-switched antenna is not 0, the determining module determines whether the current operating phase is the last operating phase;
if the current operating phase is the last operating phase, the processing module sets the holding period to be infinite so that the signal receiving-and-sending operation is always performed by the currently operating antenna; and
if the current operating phase is not the last operating phase, the processing module decreasing the holding period by 1.

7. The device of claim 6, wherein:
the determining module determines whether a variation range of the wireless signal quality in the wireless network environment reaches a threshold value; and
if the variation range of the wireless signal quality in the wireless network environment does not reach the threshold value, the data collecting module continuously collects the multiple wireless signal parameters of the wireless network environment.

8. The device of claim 7, wherein:
if the variation range of the wireless signal quality in the wireless network environment reaches the threshold value, the processing module sets the holding period of the currently operating antenna as 0, and the data collecting module continuously collects the multiple wireless signal parameters of the wireless network environment.

9. A non-transitory computer-readable storage medium storing game program which causes a computer to execute:
a process of collecting multiple wireless signal parameters of a wireless network environment;
a process of, under a current operating phase, determining whether a holding period of a to-be-switched antenna is 0;
a process of, if the holding period of the to-be-switched antenna is 0, comparing qualities of wireless signals between an initial antenna and the to-be-switched antenna according to the wireless signal parameters and determining whether a comparing period is 0;
a process of calculating cell loading values of the initial antenna and the to-be-switched antenna using a formula (1), wherein the formula (1) is represented as:

$$\text{Cell\_Loading} = \frac{5}{7N} \times 10^{\frac{(RSSI-RSRP)}{10}}; \tag{1}$$

where N=12×channel_bandwidth×5, N represents a total amount of subcarriers and channel_bandwidth represents bandwidth;

a process of calculating signal scores of the initial antenna and the to-be-switched antenna using a formula (2), wherein the formula (2) is represented as:

Score=RSRP+(0.73−Cell_Loading×1.67)×RSRQ  (2);

a process of determining a wireless signal quality of the initial antenna and the to-be-switched antenna according to the signal scores of the initial antenna and the to-be-switched antenna;
a process of, if the comparing period is 0, determining whether an antenna switching operation is performed;
a process of, if the antenna switching operation is not performed, taking the next operating phase as the current operating phase and setting the holding period and the comparing period according to the adjusted current operating phase; and
a process of, if the antenna switching operation is performed, switching a signal receiving-and-sending operation from the to-be-switched antenna to an outdoor antenna or from the outdoor antenna to the to-be-switched antenna and taking the previous operating phase as the current operating phase and setting the holding period and the comparing period according to the adjusted current operating phase.

10. The non-transitory computer-readable storage medium of claim 9, further comprising:
a process of, if the holding period of the to-be-switched antenna is not 0, determining whether the current operating phase is the last operating phase;
a process of, if the current operating phase is the last operating phase, indicating that the holding period is infinite and the signal receiving-and-sending operation is always performed by the currently operating antenna; and
a process of, if the current operating phase is not the last operating phase, decreasing the holding period by 1.

11. The non-transitory computer-readable storage medium of claim 10, further comprising:
a process of determining whether a variation range of the wireless signal quality in the wireless network environment reaches a threshold value; and
a process of, if the variation range of the wireless signal quality in the wireless network environment does not reach the threshold value, continuously collecting the multiple wireless signal parameters of the wireless network environment.

12. The non-transitory computer-readable storage medium of claim 11, further comprising:
a process of, if the variation range of the wireless signal quality in the wireless network environment reaches the threshold value, setting the holding period of the currently operating antenna as 0, continuously collecting the multiple wireless signal parameters of the wireless network environment.

\* \* \* \* \*